United States Patent
Rinn

(10) Patent No.: US 6,559,458 B2
(45) Date of Patent: May 6, 2003

(54) MEASURING INSTRUMENT AND METHOD FOR MEASURING FEATURES ON A SUBSTRATE

(75) Inventor: Klaus Rinn, Heuchelheim (DE)

(73) Assignee: Leica Microsystems Wetzlar GmbH (DE)

( * ) Notice: Subject to any disclaimer, the term of this patent is extended or adjusted under 35 U.S.C. 154(b) by 134 days.

(21) Appl. No.: 09/681,096

(22) Filed: Jan. 4, 2001

(65) Prior Publication Data

US 2001/0008272 A1 Jul. 19, 2001

Related U.S. Application Data

(60) Provisional application No. 60/176,284, filed on Jan. 14, 2000.

(30) Foreign Application Priority Data

Jan. 14, 2000 (DE) .......................... 100 01 239

(51) Int. Cl.[7] .......................... H01J 37/22; G01B 11/30
(52) U.S. Cl. .................... 250/491.1; 250/306; 250/307; 73/105
(58) Field of Search ................................ 250/306, 307, 250/491.1; 73/105

(56) References Cited

U.S. PATENT DOCUMENTS

| | | | | |
|---|---|---|---|---|
| 5,245,863 A | * | 9/1993 | Kajimura et al. | 73/105 |
| 5,406,833 A | * | 4/1995 | Yamamoto | 73/105 |
| 5,436,448 A | * | 7/1995 | Hosaka et al. | 250/306 |

* cited by examiner

Primary Examiner—John R. Lee
Assistant Examiner—Nikita Wells
(74) Attorney, Agent, or Firm—Brown Rudnick Berlack Israels LLP

(57) ABSTRACT

A measuring instrument (100) and a method for measuring features (19) on a substrate (9) are described. The measuring instrument (100) has a support element (15) that is provided opposite the substrate (9). Mounted on the support element (15) is a nonoptical measurement device (23) with which a measurement of the features (19) of the substrate (9) is performed under ambient air pressure. The nonoptical measurement device (23) can be configured, for example, as an AFM (24) or an electron beam lens (40). Furthermore, in addition to the nonoptical measurement device (23), an optical lens (10) can be provided that is used for rapid location and determination of the coarse position of features (19) on the substrate (9).

12 Claims, 4 Drawing Sheets

MEASURING INSTRUMENT AND METHOD FOR MEASURING FEATURES ON A SUBSTRATE

CROSS REFERENCE TO RELATED APPLICATIONS

This application claims the benefit of provisional application Ser. No. 60/176,284 filed Jan. 14, 2000.

Referenced-applications

This invention claims priority of a German filed patent application DE-A-100 01 239.6.

BACKGROUND OF INVENTION

The invention concerns a measuring instrument for measuring features on a substrate.

The invention furthermore concerns a method for measuring features on a substrate, the nonoptical measurement being performed under normal atmospheric pressure conditions.

The resolution of existing and future purely optical measurement systems will reach a limit in the 100 nm region. For the accuracy requirements of the current generation of semiconductor substrates (less than 10 nm), a resolution very much smaller than the feature dimensions is necessary. Even with current photolithographic masks, in which the masks and substrates have a 5× magnification, optical measurement technology is encountering its limits. This is true to an even greater extent for future lithography methods, which may have 1-to-1 imaging, and for the measurement of wafers. Nonoptical systems could achieve a greatly improved resolution. A high throughput rate and user-friendly operation are absolutely necessary in order for the new systems to be successful.

A measurement system that combines an optical and a nonoptical method is disclosed in JP Unexamined Application 09/119825. The measurement system comprises a large vacuum chamber in which the coordinates of the specimen are measured both with an optical method and with a nonoptical method. A light beam and a photodetector are used to determine the absolute coordinate I of a reference point on the specimen that is located a specific distance away from the origin. The relative coordinate L-I, referred to the absolute coordinate, is determined using an electron beam and a charged-particle detector. The specimen is displaced inside the vacuum chamber, using a slide, from the optical measurement point to the electron beam measurement point. An interferometer monitors and controls the displacement travel inside the vacuum chamber. This system has one critical disadvantage: the entire measurement must be performed in a vacuum, resulting in cumbersome handling for the user. The throughput with this system is also limited by the vacuum chamber.

A purely optical measuring instrument for determining the position of features on a transparent substrate is disclosed in DE Patent Application A-198 19 492.7-52. In this, the position of a feature on the substrate is defined by the distance of an edge of the feature relative to a reference point. The measuring instrument comprises a reflected-light illumination device, an imaging device, and a detector device for the imaged features, and a measurement table that is displaceable interferometrically relative to the optical axis. To receive the substrate, the measurement table is configured as an open frame. Provided beneath the measurement table is an illumination device whose optical axis aligns with the optical axis of the reflected-light illumination device.

SUMMARY OF THE INVENTION

It is the object of the invention to create a measuring instrument that yields reproducible measurement results of very small features on a substrate of future feature dimensions, guaranteeing user-friendliness and a high throughput rate.

The object is achieved by a measuring instrument which is characterized in that a support element is provided opposite the substrate; that a nonoptical measurement device is mounted on the support element; and that ambient air pressure exists between the nonoptical measurement device and the substrate.

A further object of the invention is to create a method that yields reproducible measurement results of very small features on a substrate of future feature dimensions, guaranteeing user-friendliness and a high throughput rate.

This object is achieved by a method which comprises the following steps: a) moving to the feature (19) that is to be measured, under ambient air pressure; b) ascertaining a coarse position of the feature (19) on the substrate; c) measuring the feature (19) that was moved to, using a nonoptical measurement device (23) under ambient air pressure; and d) determining the exact position and extent of the feature (19) Advantageous developments are evident from the features of the dependent claims.

Reproducible measurement results can be obtained with the configuration according to the present invention of the measuring instrument and the method. A particularly cost-effective and user-friendly effect results from the fact that the nonoptical measurement is performed under ambient atmospheric pressure. "Ambient atmospheric pressure" is considered to be the air pressure that is naturally present; this also refers to the air pressure in a climate chamber which regulates relative humidity and temperature but not air pressure. This becomes particularly apparent when the feature arrived at is measured using an electron beam that is generated with an electron beam lens. In this case it is then not necessary for the entire measuring instrument to be surrounded by a vacuum chamber in order to be able to perform the measurement.

The nonoptical measurement can be performed, for example, with an AFM (atomic force microscope). The throughput can be increased with an additional optical microscope or a corresponding lens. What is exploited in this context is the fact that the measurement with the optical microscope is accomplished much more quickly than with the nonoptical measurement device. For that purpose, the lens is used to select the point on the substrate that is to be more precisely examined or measured. The AFM then measures maximally in the measurement window selected by the lens.

A rigid connection, here in the form of the support element, between the AFM and the lens results in a rigid coupling of these two components. An interferometer allows an accurate determination of the position of the support element and thus also of the components arranged on the support element. The AFM can thus be positioned exactly in the optically located measurement window. It has proven to be advantageous if a lens is moved to the feature on the substrate. The necessary focusing can be accomplished with an autofocus system. In the case of the measurement method performed here, the edges of the features on the substrate are determined. Because the edges to be measured are approached optically, the measurement window for the AFM can be defined very tightly around the edges to be measured. The measurement table or also the support plate is then displaced correspondingly so that the feature to be measured ends up in the measurement window under the AFM. During the AFM measurement a determination is made, for example, of the deviation of the measurement table from the reference position using an interferometer.

An important feature for position measurement on large substrates is, as already mentioned above, the rigid coupling between the sensing system (lens, AFM) and the interferometer. For this aspect, a horizontal movement (in the X/Y plane) of the AFM sensing tip would be rather negative. The accuracy of the measurement could additionally be increased if the tip of the AFM were as immovable as possible. In this case the substrate together with the measurement table is displaced, and in the process is scanned over its entire surface by the AFM. A measurement method of this kind then has, however, a negative effect on the throughput rate.

A further nonoptical method could be implemented with an electron beam. To ensure, that the measurement does not need to be performed in a vacuum even when an electron beam is used, the electron beam lens used is one that implements in miniature, in its microscopic structure, a conventional electron-microscope column. Here again, an advantageous combination with a conventional lens is conceivable. The lens makes it possible to accelerate the process of moving to points on the substrate that are to be measured. This reduces the time of action of the electron beam on the substrate. This reduces the (already small) amount of charging in systems that operate exclusively with electron beam lenses, since a large portion of the measurement operation (e.g. focusing, fine adjustment of the measurement window, etc.) is optical. Measurement using an electron beam can considerably increase the resolution of a measurement system as compared to a conventionally optical measurement system.

BRIEF DESCRIPTION OF DRAWINGS

The drawings schematically depict four embodiments of the measuring instrument according to the present invention, which are described below with reference to the drawings.

DETAILED DESCRIPTION

Figure 1:
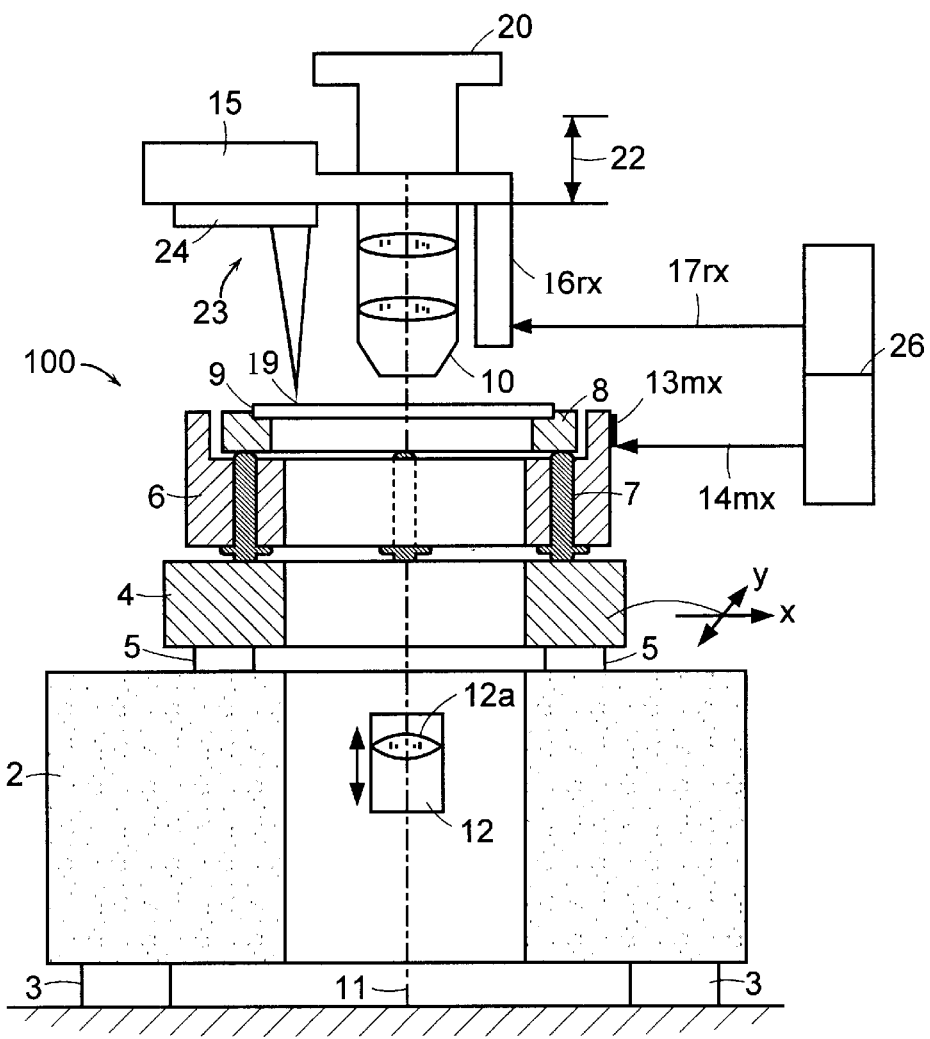
FIG. 1 shows a first embodiment of the measuring instrument in which the substrate is illuminated by transmitted light, the refined measurement being performed by way of an AFM.

The high-accuracy measuring instrument 100 depicted in FIG. 1 comprises a granite block 2 that is mounted in vibration-damped fashion on feet 3. A measurement table 4 is supported on granite block 2 on air bearings 5. It is also possible to use other bearings which can guarantee uniform and highly accurate displacement. Measurement table 4 is slidingly displaceable horizontally in two mutually perpendicular directions, indicated here by two arrows x and y, in directions X and Y. The drive systems for achieving the displacement are not depicted here. A mirror element 6 rests on measurement table 4. Passing vertically and in stress-free fashion through mirror element 6 are three studs 7 with rounded ends, which project upward and downward. By way of studs 7, mirror element 7 is supported on measurement table 4. Studs 7 are arranged so that they result in a stable three-point contact for mirror element 6 on measurement table 4, i.e. in this case two studs at the front left and right in the section plane, and the third stud at the center rear. In order for the contact surface to be kept optimally small, the lower ends of studs 7 are configured as spherical surfaces. Resting on the upper ends of studs 7 is a receptacle 8 having a frame-shaped depression into which a substrate 9 having features 19 is placed. It is also possible to place substrate 9 directly onto studs 7. Integrated into mirror element 6 are the two measurement mirrors $13_{mx}$ and $13_{my}$ (the latter not depicted) for position determination using an interferometer 26 in the X and Y axes of measurement table 4. In this example they are vacuum-deposited directly onto the material of mirror element 6. Other possibilities for achieving a reflective surface are conceivable, and are sufficiently familiar to those skilled in the art. An interferometer measurement beam $14_{mx}$ associated with the X axis, which is used for interferometric determination of the X position of measurement table 4, is directed onto measurement mirror $13_{mx}$ on mirror element 6. A measurement mirror $13_{my}$ (not depicted here) is integrated onto the rear outer side of mirror element 6. Onto this is directed an interferometer measurement beam $14_{my}$ associated with the Y axis (and also not depicted), which is used for interferometric determination of the Y position of measurement table 4.

A lens 10 which defines an optical axis 11 is directed onto the surface of substrate 9. A condenser 12, which generates transmitted-light illumination when necessary, is arranged displaceably below substrate 9 on optical axis 11. In order to make this transmitted-light illumination possible, granite block 2, measurement table 4, mirror element 6, and receptacle 8 are equipped with frame-shaped openings around optical axis 11. An illumination device 12, which comprises an adjustable-height condenser 12a and a light source 12b, is set into granite block 2. The exit surface of a light guide can also, for example, be provided as light source 12b. Condenser 12 aligns with optical axis 11 of lens 10. The height adjustment capability of condenser 12 with light source 12b serves to adapt the illumination beams to be directed onto feature 9 to different optical thicknesses of various substrates 8.

Lens 10 is mounted on a support element 15 to which a reference mirror $16_{rx}$ for interferometric X position determination of measurement table 4 is attached. It is located at a fixed distance from optical axis 11 of lens 10. A reference mirror $16_{ry}$, which is not depicted in this Figure, is also mounted for interferometric position determination of the Y axis. Proceeding from interferometer 26, a reference beam $17_{rx}$ for the X axis is directed onto reference mirror $16_{rx}$, and a reference beam $17_{ry}$ for the Y axis is directed onto reference mirror $16_{ry}$. A position detector 20 is provided on support element 15 in optical axis 11. This position detector 20 can be configured in the form of a CCD camera or a brightness detector. Also joined to support element 15 is a focus position transducer 22 which indicates the focus position of lens 10 relative to substrate 9 and which monitors and regulates the focusing of lens 10 on the substrate surface. Arranged on support element 15 alongside lens 10 is a nonoptical measurement device 23, which in the exemplary embodiment described here is configured as AFM 24. AFM 24 is used for fine measurement of features 19 on the mask surface. With lens 10, it is possible to optimize throughput by maximally limiting the measurement region of the AFM system in terms of extent (by way of a measurement window) and also in terms of height (by way of a focus range). A fine measurement of the entire surface of substrate 9 with the AFM would be much too time-consuming. Only with a rigid coupling between the sensing systems and the interferometer mirrors $13_{mx}$, $13_{my}$, $16_{mx}$, and $16_{my}$ can positions be measured exactly, so that AFM 24 can be exactly positioned in the optically located measurement window.

Figure 2:
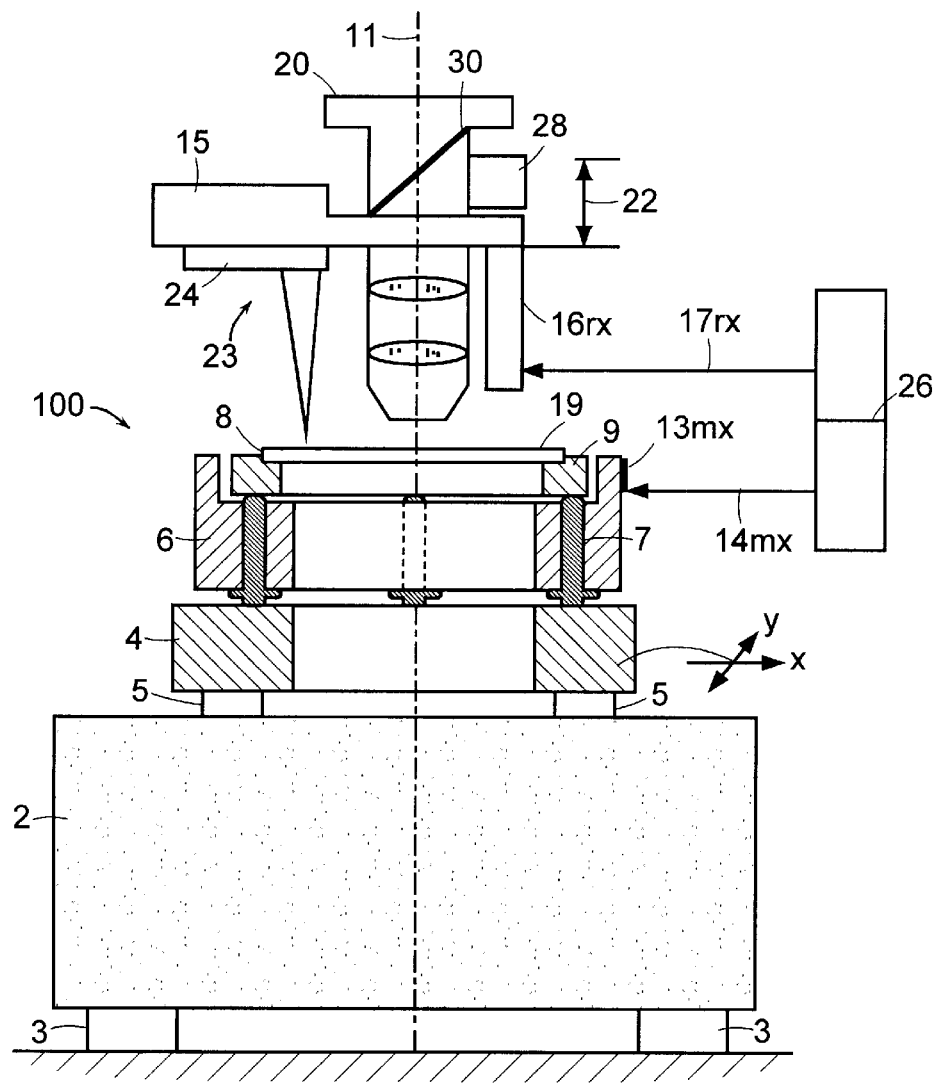
FIG. 2 shows a second embodiment of the measuring instrument in which the substrate is illuminated by incident light, the refined measurement being performed by way of an AFM.

In a second exemplary embodiment, as depicted in FIG. 2, substrate 9 is illuminated with incident light and the refined measurement is also performed using AFM 24. For the sake of simplicity, identical reference characters are used for identical components in the various embodiments. An illumination unit 28 for illuminating substrate 9 with incident light is provided on position detector 20. Provided in position detector 20 is a semitransparent optical element 30 with which the illumination is directed through the lens onto the surface of substrate 9.

Figure 3:
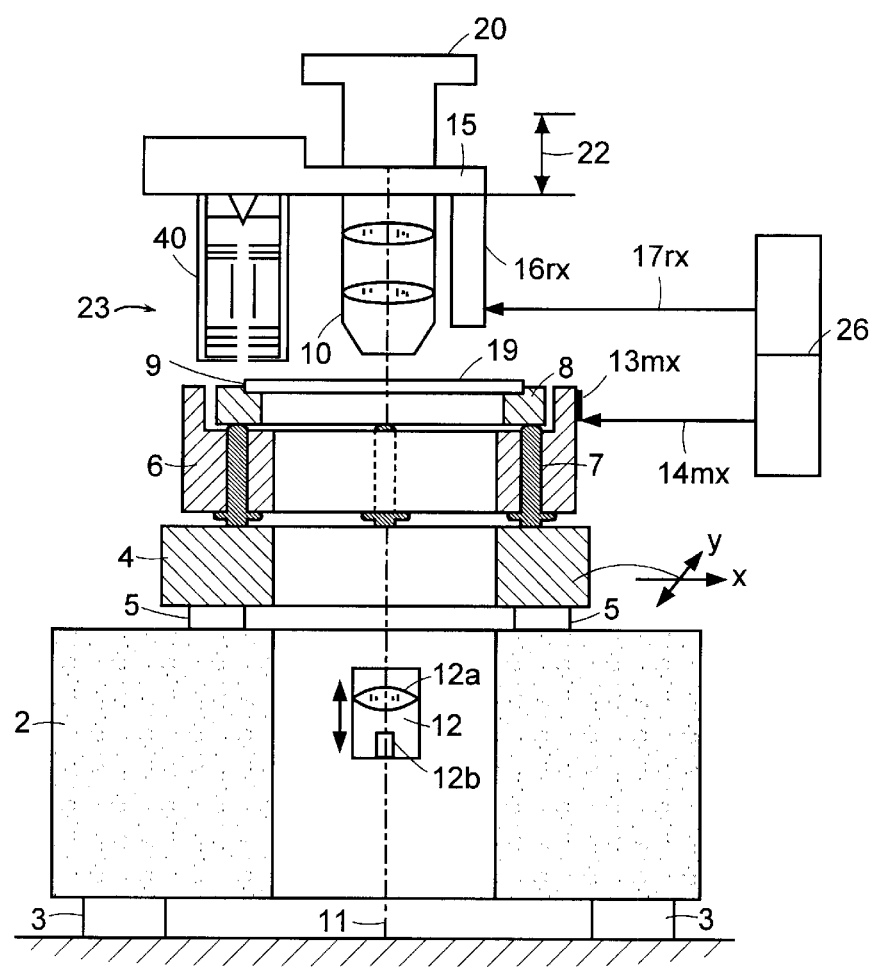
FIG. 3 shows a third embodiment of the measuring instrument in which the substrate is illuminated by transmitted light, the refined measurement being performed by way of an electron microscope.

FIG. 3 shows the third embodiment of the invention, in which an electron beam lens 40 is provided on support element 15 alongside lens 10. Electron-optical systems are by now well developed, and electron beam lenses can be made sufficiently small using micropatterning technology. In this exemplary embodiment, nonoptical measurement device 23, as already mentioned above, is configured in the form of electron beam lens 40. Electron beam lens 40 constitutes a particularly advantageous combination with lens 10. A fine measurement using exclusively electron beam lens 40 is possible. With the combination of lens 10 and electron beam lens 40, charging resulting from the electron beam is minimized, since optical methods are used for the greatest possible portion of the measurement operation (e.g. focusing, fine adjustment of the measurement field, etc.).

Figure 4:
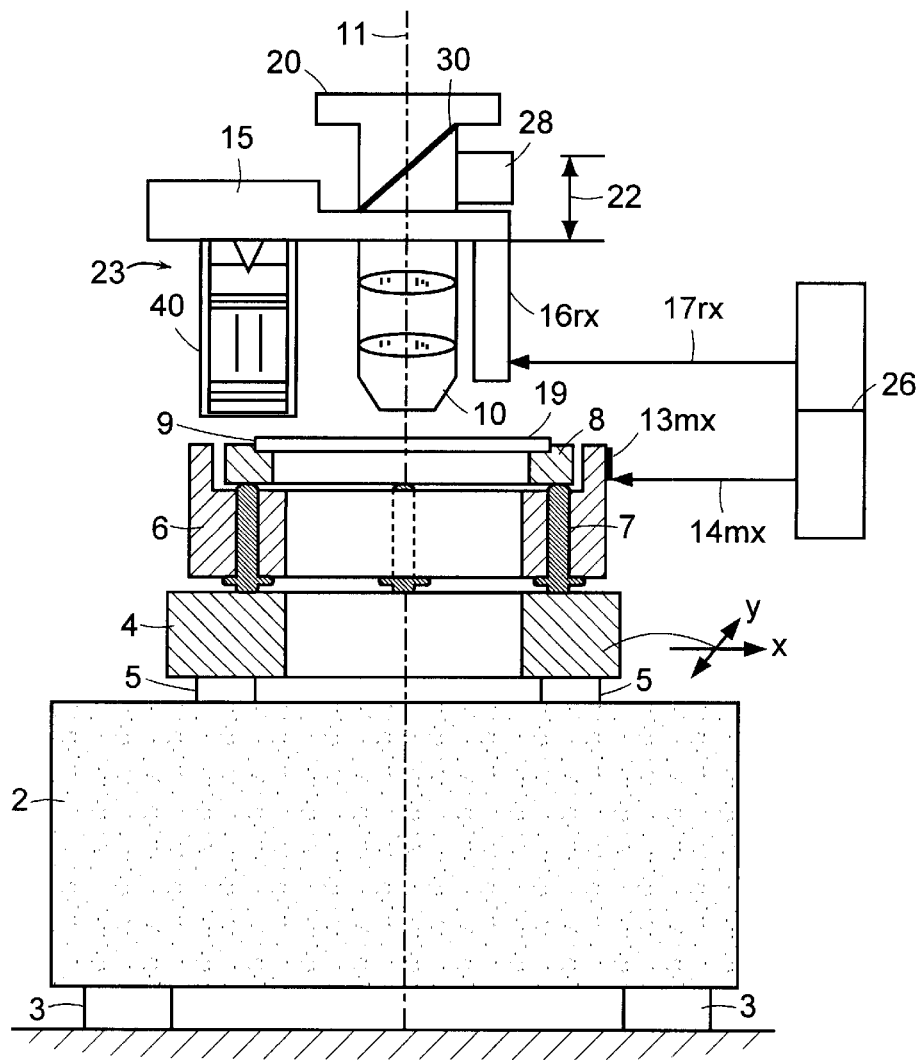
FIG. 4 shows a fourth embodiment of the measuring instrument in which the substrate is illuminated by incident light, the refined measurement being performed by way of an electron microscope.

FIG. 4 shows the fourth exemplary embodiment of the invention. Here again, as already explained in FIG. 2, an illumination unit 28 is provided on position detector 20. This arrangement thus serves to illuminate substrate 9 with incident light.

Further measurement systems are used in addition to the nonoptical measurement systems described here, for example AFM and electron beam. One of them is, for example, the photon tunneling microscope. Also to be noted is that all the nonoptical measurement systems used are suitable for measuring substrate 9 under normal atmospheric pressure conditions. It is not necessary to enclose the entire measuring instrument 100 with a chamber for evacuation.

With measurement methods according to the present invention, it is possible with lens 10 to increase and also to optimize the throughput of substrates 9 being measured. In this context, the measurement region of the AFM is maximally limited in terms of extent (by a measurement window) and also in terms of height (by a focus range).

Only with a rigid coupling of the two measurement systems and of interferometer mirrors $16_{rx}$ and $16_{ry}$ can positions be measured exactly. The AFM is positioned exactly in the optically located measurement window in accordance with the purely optical measurement.

One possible exemplary embodiment of a measurement method with an AFM is explained below. Lens 10 is moved to substrate 9. The optical system then focuses on the point on substrate 9 to be measured. The edges to be measured are then localized optically. A coarse position of the feature to be measured is thereby determined. Around this coarse position, a region which then defines the measurement window for AFM 24 is determined. The measurement window is thus defined very tightly around the edge. Measurement table 4 is then moved correspondingly so that the measurement window ends up beneath AFM 24. In this context, the deviation of measurement table 4 from the coarse position is determined, and thus the exact position and extent of the feature are ascertained. The accuracy of a system having an AFM 24 could be even further enhanced if it were assumed that the tip of AFM 24 is as immovable as possible. Substrate 9 would then need to be scanned by moving measurement table 4.

A further exemplary embodiment of a measurement method is implemented by way of the measuring instruments depicted in FIGS. 3 and 4. Here AFM 24 of FIGS. 1 and 2 is replaced by an electron beam lens 40. The control and regulation electronics necessary for electron beam lens 40 are not explicitly depicted here, since they are comparable to the electronic systems for conventional scanning electron microscopes and are thus sufficiently known to those skilled in the art. The measurement method using an electron beam lens 40 does not necessarily require an additional optical sensing method using lens 10. Electron beam lens 40 is moved over the surface of substrate 9, and the positions of the edges of features 19 and the corresponding feature widths are thereby determined. The charging of the surface of substrate 9 caused by the electron beam of electron beam lens 40 is already reduced, not only because electron beam lens 40 is operated with a low voltage, but also because no vacuum is present between the surface of substrate 9 and electron beam lens 40. The air molecules ionized in that area additionally carry off the excess charge, and thus provide a further reduction in the charging of substrate 9.

Here again, however, an advantageous combination with a lens 10 is conceivable. With lens 10, the surface of substrate 9 could be observed and the corresponding measurement window for electron beam lens 40 could be rapidly ascertained. The charging caused by the electron beam could thus be even further minimized by the fact that a large portion of the measurement operation (e.g. focusing, fine adjustment of the measurement field, etc.) can be performed with lens 10, i.e. optically.

Here again, as in the case of the AFM, the throughput advantage is a benefit. In particular, a further decrease in measurement errors can be achieved by multiple scanning of substrate 9 and by statistical methods in the analysis of the scans.

The present invention has been described with reference to exemplary embodiments. It is apparent to any person skilled in this art, however, that changes and modifications can be made without thereby leaving the range of protection of the Claims below.

What is claimed is:

1. A measuring instrument for measuring features on a substrate, the instrument comprising:
   an optical lens for locating features on the substrate, the optical lens disposed on a support element; and
   a non-optical measuring device disposed on the support element and rigidly associated with the optical lens under a normal air pressure, the non-optical measuring device being positioned to measure features located by the optical lens.

2. The measuring instrument according to claim 1, wherein the non-optical measuring device is an Atomic Force Microscope (AFM).

3. The measuring instrument according to claim 1, wherein the non-optical measuring device comprises an electron beam lens.

4. The measuring instrument according to claim 1, further comprising an interferometer and a displaceable measurement table for supporting the substrate, wherein the interferometer determines a reference position of the displaceable measurement table.

5. The measuring instrument according to claim 4, wherein the interferometer determines and monitors a support element position.

6. The measuring instrument according to claim 4, further comprising a focus position transducer mounted on the support element, wherein the focus position transducer indicates the focus position of the optical lens relative to the substrate and focuses the optical lens onto the substrate.

7. A method for measuring a feature on a substrate, the method comprising:
providing an optical lens rigidly associated with a non-optical measuring device on a support clement;
disposing the substrate opposite the optical lens;
using the optical lens to determine a coarse position of the feature on the substrate; and
using the non-optical measuring device to measure the feature under ambient air pressure and to determine a characteristic of the feature.

8. The method of claim 7, further including:
positioning the substrate on a measurement table, wherein the measurement table is movable in an X and Y direction; and
ascertaining an exact position of the substrate, wherein the exact position of the substrate is responsive to the position of the measurement table and the position of the non-optical measuring device, wherein the position of the measurement table is ascertained using an interferometer.

9. The method of claim 7, wherein the non-optical measuring device is configured as an Atomic Force Microscope (AFM).

10. The method of claim 7, wherein the non-optical measurement device is configured as an electron beam lens.

11. The method of claim 7, wherein the non-optical measurement device and the optical lens are mounted on the support clement such that the non-optical measurement device is disposed adjacent the optical lens in such a way that the non-optical measurement device is rigidly joined with the optical lens.

12. The method of claim 7, further including a focus position transducer mounted on the support element, wherein the focus position transducer establishes a focus position of the optical lens with respect to the substrate.

* * * * *